US010450410B2

(12) United States Patent
Gaudl et al.

(10) Patent No.: US 10,450,410 B2
(45) Date of Patent: Oct. 22, 2019

(54) PROCESS FOR PREPARING POLYESTER RESINS FROM POLYETHYLENE TEREPHTHALATE AND ENERGY CURABLE COATING COMPOSITIONS

(71) Applicant: SUN CHEMICAL CORPORATION, Parsippany, NJ (US)

(72) Inventors: Kai-Uwe Gaudl, Bavaria (DE); Juergen Dieker, Hesse (DE); Michael J. Jurek, Oak Ridge, NJ (US); Lars Keller, Hesse (DE)

(73) Assignee: Sun Chemical Corporation, Parsippany, NJ (US)

( * ) Notice: Subject to any disclaimer, the term of this patent is extended or adjusted under 35 U.S.C. 154(b) by 84 days.

(21) Appl. No.: 15/300,963

(22) PCT Filed: Apr. 21, 2015

(86) PCT No.: PCT/US2015/026807
§ 371 (c)(1),
(2) Date: Sep. 30, 2016

(87) PCT Pub. No.: WO2015/164331
PCT Pub. Date: Oct. 29, 2015

(65) Prior Publication Data
US 2017/0022318 A1 Jan. 26, 2017

Related U.S. Application Data

(60) Provisional application No. 61/983,201, filed on Apr. 23, 2014, provisional application No. 61/983,015, filed on Apr. 23, 2014.

(51) Int. Cl.
| | | |
|---|---|---|
| *B05D 3/06* | (2006.01) | |
| *C08G 63/47* | (2006.01) | |
| *C09D 11/101* | (2014.01) | |
| *C09D 11/104* | (2014.01) | |
| *C09D 4/06* | (2006.01) | |
| *C09D 167/07* | (2006.01) | |
| *C08J 11/16* | (2006.01) | |
| *C09D 11/02* | (2014.01) | |

(52) U.S. Cl.
CPC .......... *C08G 63/47* (2013.01); *B05D 3/067* (2013.01); *C08J 11/16* (2013.01); *C09D 4/06* (2013.01); *C09D 11/02* (2013.01); *C09D 11/101* (2013.01); *C09D 11/104* (2013.01); *C09D 167/07* (2013.01); *B05D 2502/00* (2013.01); *B05D 2508/00* (2013.01); *C08J 2367/02* (2013.01); *Y02W 30/705* (2015.05)

(58) Field of Classification Search
CPC B05D 2502/00; B05D 2508/00; B05D 3/067; C08G 63/47; C08J 11/16; C08J 2367/02; C09D 11/02; C09D 11/101; C09D 11/104; C09D 167/07; C09D 4/06; C09C 167/07; C09C 4/06

USPC ..................................................... 427/385.5
See application file for complete search history.

(56) References Cited

U.S. PATENT DOCUMENTS

| | | | | |
|---|---|---|---|---|
| 4,130,518 A | * | 12/1978 | Rybny .................... | C08F 8/14 522/107 |
| 4,303,696 A | * | 12/1981 | Brack .................. | C08F 283/04 427/503 |
| 4,849,495 A | * | 7/1989 | Funato .................. | C08G 63/20 528/194 |
| H1712 H | * | 2/1998 | Papalos ........................ | 560/224 |
| 6,127,436 A | * | 10/2000 | Chatterjee .............. | C08G 63/20 521/48.5 |
| 6,803,112 B1 | * | 10/2004 | Chatterjee ......... | C08F 222/1006 427/496 |
| 2009/0121363 A1 | | 5/2009 | Nakabayashi | |
| 2012/0111620 A1 | * | 5/2012 | Shibasaki ................ | C08F 2/50 174/258 |
| 2012/0245246 A1 | * | 9/2012 | Yin ....................... | C08F 283/01 522/79 |

(Continued)

FOREIGN PATENT DOCUMENTS

| | | |
|---|---|---|
| EP | 0 558 906 A1 | 9/1993 |
| EP | 558906 A1 * | 9/1993 |
| EP | 1 044 232 B1 | 8/2004 |

OTHER PUBLICATIONS

Notification Concerning Transmittal of the International Preliminary Report on Patentability (Chapter 1 of the Patent Cooperation Treaty) issued in International Application No. PCT/US2015/026807, dated Nov. 3, 2016.
Search Report in European Patent Application 15 78 3305.4 dated Nov. 22, 2017.
International Search Report issued in International Application No. PCT/US15/26807, dated Jul. 8, 2015.
Written Opinion of the International Searching Authority issued in International Application No. PCT/US15/26807, dated Jul. 8, 2015.

*Primary Examiner* — Alexander M Weddle
(74) *Attorney, Agent, or Firm* — Charles C. Achkar; Ostrolenk Faber LLP.

(57) ABSTRACT

The present invention is directed to polyester resins which are prepared by depolymerizing virgin, scrap, recycled or reclaimed polyethylene terephthalate (PET) via an alcoholysis reaction with one or more polyhydric alcohols to form a depolymerization product and esterifying the depolymerization product with one or more polybasic carboxylic acids and/or anhydrides and optionally polyhydric alcohol to form a polyester polyol. The polyester may then be acrylated with acrylic acid to form a polyester acrylate resin. The polyester resins are then used in energy curable coating compositions or inks and in particular, the polyester acrylate resin is suitably used as a reactive binder/oligomer.

30 Claims, No Drawings

(56) References Cited

U.S. PATENT DOCUMENTS

2013/0237627 A1* 9/2013 Yu .......................... C08G 63/06
                                                    522/33
2013/0323426 A1* 12/2013 Kaczun ................ C09D 11/101
                                                    427/287

* cited by examiner

US 10,450,410 B2

PROCESS FOR PREPARING POLYESTER RESINS FROM POLYETHYLENE TEREPHTHALATE AND ENERGY CURABLE COATING COMPOSITIONS

CROSS REFERENCE TO RELATED APPLICATIONS

The present application is a § 371 National Phase application based on PCT/US2015/026807 filed Apr. 21, 2015, which claims the benefit of U.S. Provisional Application Nos. 61/983,201, filed Apr. 23, 2014 and 61/983,015, filed Apr. 23, 2014, the subject matter of each of which is incorporated by reference in their entirety.

FIELD OF THE INVENTION

The present invention is directed to polyester resins which are prepared by depolymerizing virgin, scrap, recycled or reclaimed polyethylene terephthalate (PET) via an alcoholysis reaction with one or more polyhydric alcohols to form a depolymerization product and esterifying the depolymerization product with one or more polybasic carboxylic acids and/or anhydrides and optionally polyhydric alcohol to form a polyester polyol. The polyester may then be acrylated with acrylic acid to form a polyester acrylate resin.

The polyester resins are then used in energy curable coating compositions or inks and in particular, the polyester acrylate resin is suitably used as a reactive binder/oligomer.

BACKGROUND OF THE INVENTION

Recycling of waste PET, either post-consumer or non-post-consumer, is a worldwide concern due to its environmental impact and the increasing volume of these materials being produced by society.

Furthermore, energy curable coating compositions and inks, in particular, ultraviolet (UV) curable coating compositions and inks have become increasingly popular because they do not employ volatile organic solvents and thus avoid the associated health and environmental concerns. Furthermore they are applicable in a wide range of printing techniques and cure rapidly upon irradiation.

Curing of energy curable coating compositions and inks predominantly proceeds via a radical polymerization mechanism. Thus, the binder/resin material of the coating compositions and inks advantageously must comprise functional groups which are capable of undergoing radical polymerization. Typically, these functional groups are unsaturated groups such as acrylate groups.

U.S. Pat. No. 6,127,436 is directed to a method of depolymerizing reclaimed, recycled or virgin PET via an alcoholysis reaction using glycols and polyhydric alcohols. The depolymerizied product is then esterified with polybasic carboxylic acids, anhydrides or acyl halides to produce a composition containing inert oligomeric binders which are useful in curable coatings.

David E. Nikles, Medhat S. Farahat—Macromol. Mater. Eng. 2005, 290, 13-30—New Motivation for the Depolymerization Products Derived from Poly(Ethylene Terephthalate) (PET) Waste: a Review; discloses that PET waste can be converted to acrylate-terminated PET low molecular weight oligomers by a two-stage process, first glycolysis with diethylene glycol followed by reaction with acryloyl chloride which can be cured by UV radiation.

Consequently it is an object of the present invention to provide a polyester acrylate resin which is derived from substantial amounts of reclaimed, recycled or virgin PE, that is advantageously highly energy curable and has a sufficiently high molecular weight such that it can be suitably incorporated into coating compositions or inks.

SUMMARY OF THE INVENTION

The present invention provides a process for preparing a polyester acrylate resin having a number average molecular weight ($M_n$) of at least 800 Da comprising
  a) reacting polyethylene terephthalate (PET) with one or more polyhydric alcohols to provide a depolymerization product;
  b) reacting the depolymerization product with a polybasic carboxylic acid and/or anhydride and optionally a polyhydric alcohol to form a polyester polyol and
  c) reacting the polyester alcohol with acrylic acid to provide a polyester acrylate resin.

In a particular embodiment steps (a) and (b) of the process of the can be combined into a single step and thus the present invention further provides a process for preparing a polyester acrylate resin having a number average molecular weight ($M_n$) of at least 800 Da comprising
  a) reacting polyethylene terephthalate (PET) with one or more polyhydric alcohols and a polybasic carboxylic acid and/or anhydride to form a polyester polyol and
  b) reacting the polyester polyol with acrylic acid to provide a polyester acrylate resin.

Furthermore the present invention provides a polyester acrylate resin prepared by the above mentioned process.

Additionally, the present invention provides an energy curable coating composition or ink comprising the polyester acrylate resin.

Finally the present invention also provides an energy curable coating composition or ink comprising between 2 to 40 wt % of an inert polyester resin,
  wherein the inert polyester resin comprises a polyethylene terephthalate oligomer having about 40 to 70 wt % recurring ethylene terephthalate units, recurring units of C3+ alpha alkylene terephthalate, hydroxy alkylene terephthalate and pendant units of polybasic aliphatic, alicyclic or aromatic monocarboxylate and
  wherein the inert polyester resin is typically prepared by reaction steps (a) and (b).

These and other objects, advantages, and features of the invention will become apparent to those persons skilled in the art upon reading the details of the methods and formulations as more fully described below.

DETAILED DESCRIPTION OF THE INVENTION

It has been found that an energy curable polyester acrylate resin having a number average molecular weight ($M_n$) of at least 800 Da prepared by depolymerizing, esterifying and acrylating PET can be suitably incorporated into energy curable coating compositions and inks.

These energy curable coating compositions and inks exhibit improved cure and thus are particularly useful for printing applications where high speed printing is desired such as lithographic inks.

Furthermore it has been found that between 2 to 40 wt % of an inert polyester resin comprising a polyethylene terephthalate oligomer having about 40 to 70 wt % recurring ethylene terephthalate units, recurring units of C3+ alpha alkylene terephthalate, hydroxy alkylene terephthalate and pendant units of polybasic aliphatic, alicyclic or aromatic monocarboxylate prepared by depolymerizing and esterifying PET can also be suitably incorporated into energy curable coating compositions and inks.

These energy curable coating compositions or inks exhibit improved deinking properties and improved solvent resistance.

The PET may be derived from polymerizing terephthalic acid and ethylene glycol (virgin PET), but is preferably derived from waste material generated in the PET production process and waste materials generated in the production of PET molded articles (pre-consumer scrap). Advantageously, the PET is derived from PET molded articles (post-consumer scrap).

Typically the waste PET comprises regrinds which are obtained by physically and mechanically grinding PET bottles into chips, powder, pellets or flakes.

The process according to the present invention is advantageous in that even low quality and/or low molecular weight PET can be used given that the initial step requires depolymerization.

Furthermore in addition to polymers consisting only of terephthalic acid and ethylene glycol the PET as described herein may also comprise a modifying co-monomer such as cyclohexanedimethanol, isophthalic acid, and/or naphthalenedicarboxylic acid.

Additionally, the PET may be transparent or non-transparent, clear or colored or have printing thereon.

The polyhydric alcohols used in step (a) have at least two hydroxyl groups and are typically selected from 1,2-ethylene glycol, diethylene glycol, propylene glycol, dipropylene glycol, tripropylene glycol, 1,3-propanediol, polyethylene glycol, polypropylene glycol, 2-methyl-1,3-propanediol, 1,2-butandiol, 1,3-butanediol, 1,4-butanediol, 1,6-hexanediol, neopentyl glycol (2,2-dimethyl-1,3-propandiol), 2-butyl-2-ethyl-1,3-propanediol, 2,2,4-trimethyl-1,3-petanediol, 3-methyl-1,5-petanediol, ethoxylated neopentylglycol, propoxylated neopentylglycol, 1,4-cyclohexanedimethanol, bisphenol-A, ethoxylated bisphenol-A, hydrogenated bisphenol A, an alkylene oxide adduct of hydrogenated bisphenol A, and tri-functional or higher functional polyhydric alcohols, such as glycerol, trimethylolpropane, ethoxylated trimethylolpropane, propoxylated trimethylolpropane, propoxylated glycerol, pentaerythritol, ethoxylated pentaerythritol, propoxylated pentaerythritol, di-trimethylolpropane, di-pentaerythritol, ethoxylated dipentaerythritol and sorbitol.

Advantageously, the polyhydric alcohols are neopentyl glycol and/or trimethylolpropane.

Preferably, the weight % ratio of PET to the polyhydric alcohol in the depolymerization step is between 20:1 to 1:10, and most preferably between 10:1 to 1:1.

Advantageously, a catalyst is used in step (a) to promote the depolymerization reaction.

Suitable catalysts include organic acid salts, alkoxides or chelates of metals and preferably the catalyst is a titanium or a tin compound, particularly a titanium alkoxide e.g. tetraisopropyltitanate or titanium(IV) butoxide.

Typically the amount of the catalyst used is between 0.01 to 2.50 wt % based on the total weight of reaction mixture.

The depolymerization reaction is preferably carried out at a temperature of between 160 to 260° C., preferably between 190° C. to 230° C. and most preferably between 215 to 225° C.

Typically, the depolymerization reaction occurs over a period of between 1 to 12 hours, preferably between 2 to 4 hours e.g. 3 hours. Advantageously, the depolymerization reaction is carried out until the solid PET and polyhydric alcohol mixture is converted to a clear or homogeneous mixture or a melt solution that contains no visible PET particles.

The depolymerization reaction can be carried out at atmospheric, subatmospheric or supra-atmospheric pressures, but is preferably is carried out at atmospheric pressure.

The depolymerization product (PET polyol) can range from a polymeric glass to a viscous liquid.

Furthermore the color of the depolymerisation product depends on the quality of the PET material used.

Typically, if low quality PET is used, for example post-consumer PET bottles with a large amount of insoluble impurities such as paper labels on the bottles or rub-off parts collected in the process of mechanical cutting of the bottles, the depolymerization product is filtered after step (a).

The depolymerisation product is then esterified in step (b) with a polybasic carboxylic acid and/or anhydride and optionally a polyhydric alcohol.

Typically, the polybasic carboxylic acids and/or anhydrides include unsaturated polybasic acids, such as maleic acid, maleic anhydride, fumaric acid, and itaconic acid; aliphatic saturated polybasic acids, such as malonic acid, succinic acid, adipic acid, azelaic acid, and sebacic acid; aromatic saturated polybasic acids such as phthalic anhydride, isophthalic acid, terephthalic acid, trimellitic acid, 2,6-naphthalenedicarboxylic acid; alicyclic polybasic acids, such as tetrahydrophthalic anhydride, hexahydro-4-methylphthalic anhydride (MHHPA), 1,2-hexahydrophthalic anhydride, 1,4-cyclohexanedicarboxylic acid, and nadic acid. A preferred acid derivative is a di-carboxy aromatic carboxylic acid anhydride.

Preferably, the polybasic carboxylic acids and/or anhydrides are selected from phthalic acid anhydride (PAA) or methylhexahydrophthalic acid anhydride (MHHPA) and advantageously mixtures of PAA and MHHPA are used.

The polybasic carboxylic acids and/or anhydrides are preferably added in an amount of less than 60 wt % based upon the weight of the depolymerization product and advantageously added in an amount of between 5 to 60 wt %.

In a preferred embodiment of the present invention, polyhydric alcohols are also added to the reaction mixture in step (b) in order to form a polyester-polyol.

The polyhydric alcohol(s) used in step (b) may be the same as those polyhydric alcohols used step (a).

Preferably, the polyhydric alcohols used in step (b) are tri functional or higher functional polyhydric alcohols such as trimethylol propane, alkoxylated trimethylolpropane, ditrimeylolpropane or pentaerythritol.

Advantageously, the polyhydric alcohol used in step (b) is neopentyl glycol.

Typically, the polyhydric alcohol(s) used in step (b) are added in an amount of 20 wt % or less based on the weight of the depolymerization product and advantageously added in an amount of between 3 to 20 wt %.

Furthermore, a monofunctional acid, such as benzoic acid, may also be added to the reaction mixture during step (b).

The esterification reaction of step (b) is preferably carried out at a temperature of between 180° C. to 220° C. and preferably carried out in an inert atmosphere, such as nitrogen or argon.

Typically the esterification reaction is carried out at pressure of between 5,000 to 150,000 Pa, preferably between 10,000 to 120,000 Pa and most preferably at atmospheric pressure.

Typically, the esterification reaction is carried out until the acid value of the reaction mixture is reduced to between 2 to 50 mg KOH/g and preferably to between 2 to 30 mg KOH/g.

The polyester polyol produced in step (b) may be in the form of a clear viscous liquid or hard solid resin.

Typically, the polyester polyol has a number average molecular weight ($M_n$) of between 850 to 5,000 Da and a weight average molecular weight ($M_w$) of between 1,500 to 25,000 Da.

Additionally, the hydroxyl value of the polyester polyol is preferably at least 100, more preferably between 150 to 600 and most preferably between 250 to 500.

In a preferred embodiment the polyester polyol has a substantial proportion of primary alcohol groups to facilitate the acrylation reaction of step (c).

The polyester-polyol is then acrylated in step (c) with acrylic acid.

The acrylation of step (c) is preferably done in the presence of an acidic catalyst, such as methane sulfonic acid and advantageously carried out in the presence of a polymerization inhibitor.

Suitable inhibitors include phenols, such as 4-methoxyphenol or a copper or an aluminum based inhibitor.

The acrylation of step (c) is carried out at a temperature of between 80 to 130° C., preferably between 90 to 110° C.

The polyester acrylate resin produced may be a solid or a viscous liquid and is typically pale yellow to green to light brownish in color.

The polyester acrylate resin usually has a number average molecular weight ($M_n$) of between 800 to 20,000 Da, a weight average molecular weight ($M_w$) of between 2000 to 25,000 Da and an acrylic acid ester group content of between 1 to 6 mmol/g.

Preferably the polyester acrylate resin has an acid value of between 2 to 50 mg KOH/g.

The present invention also provides an energy curable coating composition or ink comprising an inert polyester resin and/or a polyester acrylate resin.

When the coating compositions or inks contain a polyester acrylate resin this is typically present in an amount of between 1 to 80 wt %, preferably between 5 to 70 wt %, more preferably between 10 to 60 wt % and advantageously between 15 to 50 wt %.

When the compositions contain an inert polyester resin this is present in an amount of between 2 to 40 wt %, preferably between 5 to 30 wt %, and advantageously between 15 to 25 wt %.

The energy curable coating compositions or inks may additionally contain other acrylated oligomers, typically with an acrylate functionality ≥2, such epoxy acrylates, polyester acrylates, acrylated polyurethanes, acrylated polyacrylates, acrylated polyethers, acrylated oils based on linseed oil, soybean or castor oil and mixtures thereof.

The weight average molecular weight ($M_w$) of the other acrylated oligomers is usually between 400 to 3000 Da.

The other acrylated oligomers are incorporated in the coating compositions or inks to impart rheology, pigment wetting, transfer, gloss, chemical resistance and other film properties.

Furthermore the energy curable coating compositions or inks may additionally contain acrylic monomers and are typically esters of acrylic acid having a functionality ≥2.

The weight average molecular weight ($M_w$) of the acrylic monomers is usually between 200 to 800 Da.

Typically the energy coating compositions and inks contain between 15 to 45 wt % of acrylic monomers, preferably between 20 to 40 wt % and most preferably between 25 to 35 wt %.

These acrylic monomers are incorporated into the coating compositions or inks to impart curing speed, solvent resistance, hardness and allow viscosity adjustment.

The acrylated oligomers and acrylic monomers may be selected from 1,2-ethylene glycol diacrylate, 1,4-butandiol diacrylate, 1,6-hexandiol diacrylate, dipropylene glycol diacrylate, neopentylglycol diacrylate, ethoxylated neopentylglycol diacrylates, propoxylated neopentylglycol diacrylates, tripropylene glycol diacrylate, bisphenol-A diacrylate, ethoxylated bisphenol-A-diacrylates, bisphenol-A-diglycidylether diacrylate, ethoxylated bisphenol-A-diacrylates, poly(ethylene)glycol diacrylates, trimethylolpropane triacrylate, trimethylolpropane trimethacrylate, ethoxylated trimethylolpropane triacrylates, propoxylated trimethylolpropane triacrylates, propoxylated glycerol triacrylates, pentaerythritol triacrylate, ethoxylated pentaerythritol triacrylates, propoxylated pentaerythritol tetraacrylates, ethoxylated pentaerythritol tetraacrylates, ditrimethylolpropane tetraacrylate, dipentaerythritol pentaacrylate, dipentaerythritol hexaacrylate ethoxylated dipentaerythritol hexaacrylates or mixtures thereof, and are preferably ethoxylated trimethylolpropane triacrylates, ethoxylated pentaerythritol triacrylates and propoxylated pentaerythritol tetraacrylates.

In particular, when the coating composition or ink is formulated for food packaging, multifunctional acrylates such ethoxylated pentaerythritol tetraacrylates, ditrimethylolpropane tetraacrylate, dipentaerythritol pentaacrylate, dipentaerythritol hexaacrylate, ethoxylated dipentaerythritol hexaacrylates or mixtures thereof are preferred.

The energy curable coating compositions or inks may also contain one or more colorants in the form of a dye or pigment dispersed therein. Suitable pigments include conventional organic or inorganic pigments. Representative pigments may, for example, be selected from the group of Pigment Yellow 1, Pigment Yellow 3, Pigment Yellow 12, Pigment Yellow 13, Pigment Yellow 14, Pigment Yellow 17, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 111, Pigment Yellow 114, Pigment Yellow 121, Pigment Yellow 126, Pigment Yellow 127, Pigment Yellow 136, Pigment Yellow 138, Pigment Yellow 139, Pigment Yellow 174, Pigment Yellow 176, Pigment Yellow 188, Pigment Yellow 194, Pigment Orange 5, Pigment Orange 13, Pigment Orange 16, Pigment Orange 34, Pigment Orange 36, Pigment Orange 61, Pigment Orange 62, Pigment Orange 64, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 48: 2, Pigment Red 53: 1, Pigment Red 57: 1, Pigment Red 81: 1, Pigment Red 112, Pigment Red 122, Pigment Red 170, Pigment Red 184, Pigment Red 210, Pigment Red 238, Pigment Red 266, Pigment Blue 15, Pigment Blue 15: 1, Pigment Blue 15: 2, Pigment Blue 15: 3, Pigment Blue 15: 4, Pigment Blue 61, Pigment Green 7, Pigment Green 36, Pigment Violet 1, Pigment Violet 19, Pigment Violet 23, and Pigment Black 7.

The energy curable coating compositions or inks are advantageously UV curable and typically contain photoinitiators, such as for example benzophenones, benzilketales, dialkoxy acetophenones, hydroxyalkyl-acetophenones, aminoalkylphenones, acylphosphinoxides and thioxanthones, for example benzophenone, methylbenzophenone, 4-phenylbenzophenone, 4,4'-bis(dimethylamino)-benzophenone, 4,4'-bis(diethylamino)-benzophenone, 2,2-dimethoxy-2-phenylacetophenone, dimethoxyacetophenone, diethoxy-acetophenone, 2-hydroxy-2-methyl-1-phenylpropan-1-one, 2-benzyl-2-dimethylamino-1-(4-morpholinophenyl)-butan-1-one, 2-methyl-1-[4(methoxythio)-phenyl]-2-morpholinopropan-2-one, diphenylacylphenyl phosphinoxide, diphenyl(2,4,6-trimethylbenzoyl) phosphinoxide, 2,4,6-trimethylbenzoylethoxyphenyl phosphinoxide, 2-isopropylthioxanthone, 4-isopropylthioxanthone, 2,4-dimethylthioxanthone or mixtures thereof.

Furthermore the energy curable coating compositions or inks may further contain the usual additives to modify flow, surface tension, gloss, pigment wetting and abrasion resistance of the cured coating or printed ink. Such additives include surface active agents, waxes, shelf-life stabilizers, and combinations thereof.

These additives may function as leveling agents, shelf-life stabilizers, wetting agents, slip agents, flow agents, dispersants and de-aerators. Preferred additives include fluorocarbon surfactants, silicones and organic polymer surfactants. Examples include the Tegorad product lines (Tegorad are trademarks and are commercially available products of Tego Chemie, Essen, Germany) and Solsperse product lines (Solsperse are trademarks and are commercially available products of Lubrizol Company).

Furthermore the energy curable coating compositions or inks may further contain the usual extenders such as clay, talc, calcium carbonate, magnesium carbonate or silica to adjust water uptake, misting and color strength.

Typically, the energy curable coating compositions or inks have a viscosity of between 5 to 100 Pas, preferably between 20 to 50 Pas at a shear rate of D=50 l/s, flow values of between 3 to 15 cm, and a tack of between 200-450 units, preferably between 250-350 units.

The present invention also provides articles coated with the coating compositions or inks. The coating compositions or inks are typically applied to the articles using inkjet, flexo, gravure, screen, and litho printing and are subsequently cured.

The articles may be composed of any typical substrate such as paper, plastics, metals and composites. The substrate may be paper print stock typically used for publications or may be a packaging material in the form of a cardboard sheet or corrugated board.

Furthermore, the substrate may be a polyolefin, such as a polyethylene or a polypropylene, a polyester such as polyethylene terephthalate, or a metalized foil such as an laminated aluminum foil or a metalized polyester.

The coating compositions or inks may be cured using an electron beam (EB) but are preferably cured using ultraviolet light (UV).

The compositions may be cured by an actinic light source, such as for example UV-light, provided by a high-voltage mercury bulb, a medium-voltage mercury bulb, a xenon bulb, a carbon arc lamp, a metal halide bulb, a UV-LED lamp, a uv laser, such as a semiconductor laser or an eximer laser or sunlight.

The wavelength of the applied radiation is preferably within a range of between 200 to 500 nm, more preferably between 250 to 350 nm.

Advantageously, the energy curable coating compositions or inks are energy curable lithographic inks.

The present invention has been described in detail, including the preferred embodiments thereof. However, it will be appreciated that those skilled in the art, upon consideration of the present disclosure, may make modifications and/or improvements on this invention that fall within the scope and spirit of the invention.

The invention is further described by the examples given below.

EXAMPLES

The following examples illustrate specific aspects of the present invention and are not intended to limit the scope thereof in any respect and should not be so construed.

Testing Methods and Definitions:

Method of Determining the Acid Value:

0.2-1.0 g of sample was placed into a 50 ml Erlenmeyer and dissolved in 10-20 ml of acetone (10-20 ml). 3 drops of 1% alcoholic phenolphthalein solution was added and this was titrated with standardized 0.1 N alcoholic potassium hydroxide (KOH) to obtain a pink color lasting for 15 seconds and the number of mls of KOH solution used was recorded.

The acid value was calculated as follows;

$$\text{Acid Number} = \frac{\text{ml KOH} \times 0.1 \times 56.1 \text{ (mg KOH/g)}}{\text{Sample weight (g)}}$$

Method of Determining the Molecular Weight:

The number average molecular weight (Mn) and weight average molecular weight (Mw) were determined by size exclusion chromatography (GPC) with monodisperse polystyrene equivalent molecular weight calibration standard and GPC columns (manufactured by Tosoh Corp., G1000HXL, G500HXLx1, Gl00HXLx1).

A flow rate of 1.0 ml/min, an tetrahydrofurane eluent, a column temperature of 40° C., a differential refractive index detector (RI) and a UV-detector (254 nm) was used.

The dispersability was calculated from the measurement results. The formula for Polydispersity (D) is Mw/Mn.

Method of Determining the Color:

The color of the resins was measured using the Lovibond 2000 Comparator with Daylight color measuring system. The samples (50 wt % solution in ethyl acetate) were visually matched against calibrated, color stable glass standards in test discs. The scale discs color standards used were the Gardner 4/30AS (with the colors 1 to 9) and the Gardner 4/30BS (with the colors 10 to 18).

Method of Determining Viscosity:

The viscosity was determined with a Physika 300 cone and plate rheometer from Anton Parr GmbH at a shear rate of D=2-100 l/s. The viscosity value at D=50 l/s was recorded.

Method of Determining Tack:

Tack was measured with a calibrated "Tack-o-scope" instrument (Model 2001) from IGT testing systems, Netherlands. 1 ml of sample was placed on the EPDM rubber distribution roller 30° C., distributed for 90 seconds at a roller speed of 50 rpm, then 30 seconds at 300 rpm. Then the tack value is taken at a roller speed of 150 rpm.

Method of Determining Flow:

The flow was measured with a vertically arranged aluminum plate on which 1 ccm of sample was placed. The distance that the sample travelled down the plate over a period of 15 minutes was recorded.

Method of Determining UV-Cure:

The extent of UV-cure is assessed by a thumb twist test and a solvent resistance test with isopropanol (IPA). Such a test is well known in the art and is, for example, described on page 74 of Test Methods for UV and EB Curable Systems, C. Lowe & P. K. T Oldring, SITA Technology, 1994, ISBN 0 947798 07 2.

Good cure can be defined as the degree of cure in which no ink is transferred to the thumb and the ink has a solvent resistance of at least 10 IPA double-rubs. The press operator notes the lamp settings at which good cure is observed:

1 lamp low (best cure)
1 lamp high (good cure)
1 lamp high, 1 lamp low (fair-good cure)
2 lamps high (fair)

Method of Determining Misting:

Misting is assessed at different places on the press, usually near an ink duct and a printing plate. A white piece of paper is placed in a defined distance from the ink rollers and the press is run for a defined period of time at a defined speed and temperature. Then, the ink mist which is transferred to the paper is assessed by visual comparison to a master example or by measurement with a densitometer. Very little ink on the paper means that the ink has very low misting and low tendency to contaminate the printing press and press room with ink mist.

Visual assessment of misting can be described as follows:

Very good (ink mist is undetectable or minimal)
Good (small amount of ink mist is deposited on the paper)
Bad (large amount of ink mist is deposited on the paper).

Method of Determining Lithographic Performance:

This was done with a high speed lithotronic emulsification tester (Novocontrol GmbH, Germany). The lithotronic tester can perform emulsification tests at high speed and shear stress.

Method of Determining Press Performance:

To test the press performance of inks they were printed with a "Didde" web offset UV-press (Graphic system services, U.S.A.) equipped with two UV-dryers having high pressure mercury bulbs.

Method of Determining Set-Off:

Set-off is defined as the tendency of ink to transfer from a freshly printed surface to another paper when pressed without any friction. Set-off is an unwanted behavior of paper and ink. It is influenced by the characteristics of the paper and ink: a porous paper surface absorbs the ink fast results in lesser set-off, as do inks that dry (or set) quickly. The higher the speed of the press, the higher the set-off will be.

Set-off is measured at two different time intervals, 0.35 s and 3 s. A freshly printed surface is pressed against a paper after 0.35 s and after 3 s. Then the set-off density is measured. The two time periods allows the set-off to be determined when the materials are used in a high-speed press and a low-speed press. Samples were measured on a prüfbau Deltack at a single time using curing energy to determine the reduction in the set-off time.

UV cured prints of inks, which were printed with a comparable density of 1.55 to 1.60, were covered with a white counter paper. Then, with a pressure of 10 tons, both the printed substrate and the plan counter paper were pressed together. Then, the counter paper was removed from the print and the amount of transferred ink on the counter paper was measured by a densitometer. The lower the amount of transferred ink provides lower readings on the densitometer which represent better cure.

Method of Determining Deinking:

The 'International Association of the Deinking industry (INGEDE) has developed a set of methods to simulate the common operating condition of the relevant process steps in an industrial deinking plant under standard conditions in a laboratory scale. This estimates the relative challenge a printed product means to a deinking plant. The INGEDE method has been developed for the assessment of the de-inkability of individual printed products. (see: Ingede Method 11, July 2012: Assessment of Print Product Recyclability: Deinkability Test; INGEDE e. V. Bietigheim-Bissingen, Germany).

The INGEDE method describes a procedure to evaluate the deinkability of printed paper products by means of alkaline flotation deinking. Flotation is the most widely used technology for ink removal in the paper recycling process. It can be used for any kind of printed paper product. The method in a laboratory scale defines the essential steps of the flotation deinking process, namely pulping and flotation. Method 11 was used and the deinkability is assessed by an optical evaluation. The deinked pulp is filtered, and by doing so, a sample is obtained. The sample is dried and the color strength is measured using a SpectroEye from Gretag AG. As a rule, if a lower color strength is measured, the pulp released a higher amount of ink which means that a better de-inkability is observed.

The color strength is defined as a pigments or dyes ability to change the color of an otherwise colorless material. Strength indices are used to compare a reference standard and a sample and define the ratio of the sample strength in relation to the reference standard. Strength indices illustrate how strong or weak a sample is in comparison to the reference standard.

Interpretation:

Percent color strength >100=deinked cellulose is stronger in color than the reference standard
Percent color strength <100=deinked cellulose is weaker in color than the reference standard
Percent color strength=100=deinked cellulose and the reference standard have the same color strength IPA Rubs Test:

The extent of UV-cure is assessed by a solvent resistance test with isopropanol (IPA). Such a test is well known in the art and is, for example, described on page 74 of Test Methods for UV and EB Curable Systems, C. Lowe & P. K. T Oldring, SITA Technology, 1994, ISBN 0 947798 07 2.

Ink Duct Setting:

This equates to the size of the opening through which the ink enters the ink train.

Printing Speed:

This is the velocity of the moving web (substrate) in feet per minute.

Water Window:

The water window gives a range of the fountain solution settings for which a targeted print density can be achieved. The larger the water window, the more robust lithography is anticipated.

Printed Optical Density:

This is the achieved optical density of the cured prints under the given ink duct settings and fountain settings when measured inline with a mounted densitometer.

Example 1 Synthesis of an Inert Polyester Resin from Recycled PET

Reclaimed or scrap PET (52.5 parts), 1,2-propanediol (4.0 parts), glycerol (9.6 parts) and Tyzor TBT catalyst (0.4 parts, available from Dorf Ketal, Tyzor® TBT is a trademark of Dorf Ketal) were charged to a dry reactor. The mixture was agitated and heated to between 215 and 220° C. under nitrogen and held at this temperature for about 4 hours whereby all the PET was dissolved. Benzoic acid (8.8 parts) and phthalic anhydride (22.8 parts) were added over a 1 hour period and the temperature was increased to 230° C. The temperature was further increased to 240° C. and maintained until the acid number was no longer decreasing linearly with time. The binder resin had an acid value of 36 mg KOH per gram, a number average molecular weight ($M_n$) of 1300 and a weight average molecular weight ($M_w$) of 6000. The Tg was determined to be 48° C. The hydroxyl value was 115.

Example 2 Synthesis of a Polyester Acrylate Resin from Recycled PET

A process for preparing a polyester acrylate resin according to the present invention was carried out as follows. Reaction steps (a) (b) and (c) are carried out in the same reactor as follows without further purification between the steps.

Step (a) Depolymerization 232.8 g (1.21 mol) of PET flakes (obtained from stf-recycling GmbH, grade: clear) 47.4 g (0.46 mol) of neopentyl glycol (2,2-Dimethyl-1,3-propanediol), 82.7 g (0.62 mol) of trimethylolpropane (2-ethyl-2-(hydroxymethyl)-1,3-propanediol) and 0.3 g Tyzor TBT catalyst were placed in a 1-liter glass flask equipped with a thermometer, an inlet nitrogen, a Dean-Stark apparatus equipped with reflux condenser, and a mechanical stirrer. The reaction mixture was heated in a nitrogen stream up to 230° C., and maintained at that temperature for about three hours. As temperature increased the PET gradually dissolved and the reaction mixture formed into a slurry which was stirred until it became transparent.

Step (b) Esterification

The reaction mixture was cooled to 125° C., and 140.3 g (0.95 mol) of phthalic acid and 81.8 g (0.79 mol) of neopentyl glycol, were added to the flask and heated under nitrogen to 240° C. The reaction was continued until the acid value dropped below 10 mg KOH/g. The resultant polyester polyol resin had a number average molecular weight ($M_n$) of 1000 and a weight average molecular weight ($M_w$) of 1800. The hydroxyl value was 300.

Step (c) Acrylation

The temperature was then lowered to 100° C. and 0.32 g of 4-methoxyphenol, 0.28 g of methane sulfonic acid, 10 ml of toluene and 10 ml of heptane was added to the flask. The nitrogen was shut off and air was bubbled through the reaction mixture. 120.0 g (1.67 mol) of acrylic acid was then added and the reaction mixture was heated to reflux. The reaction was continued until the acid value dropped below 10 mg KOH/g. Then, vacuum (100 mbar) was applied and the volatile materials were stripped off to provide a viscous liquid. The product yield was 528 g.

Characterization:
Molecular weight:
Number average molecular weight ($M_n$): 1550
Weight average molecular weight ($M_w$): 3500
Color: 3-4 Gardner
Acid value: 6 mg KOH/g
Viscosity of a varnish containing 36% of the polyester acrylate obtained after step (c) and 64% trimethylol propane triacrylate: 65.4 Pa·s @ 25° C.

Examples 3 & 4

Two ink formulations Examples 3 & 4 are shown in Table 1. The two cyan lithographic energy curable packaging inks were made on a three roll mill 3 passes at 1 MPa (25° C.), having the following composition and properties:

TABLE 1

| Material | Example 3 | Example 4 |
|---|---|---|
| Varnish with inert polyester resin of Example 1 in TMPTA (48%) | 45.15 | — |
| Varnish with polyester acrylate resin of Example 2 in TMPTA (36%) | — | 45.15 |
| Multifunctional acrylate monomer blend (Sun) | 16.00 | 16.00 |
| Flow agent (Tego) | 0.50 | 0.50 |
| Stabilizer (Rahn group) | 1.00 | 1.00 |
| Photoinitiator blend, based on aminobenzoates & benzophenones & aminoketones (Sun) | 13.00 | 13.00 |
| Blue pigment 15:3 (Sun) | 21.35 | 21.35 |
| Inorganic filler (Emerys) | 3.00 | 3.00 |
| Total | 100.00 | 100.00 |
| Viscosity @ 50 s−1 [Pa · s] | 29.83 | 39.86 |
| Tack 150 [units] | 261 | 277 |

The viscosity for Examples 3 and 4 are similar and both are suitable for use as energy curable lithographic printing inks.

Regarding water uptake, scumming, tinting and shear stress values under emulsification, the ink of Example 4 behaved very similar compared to commercial UV offset inks from the Sun Chemical Suncure product portfolio and is therefore would be expected to perform similar on an offset press.

TABLE 2

Press Performance at 400 ft./min. - the inks were tested on a Didde web offset press equipped with two UV-dryers.

| Printing Press results low speed | Example 3 | Example 4 |
|---|---|---|
| Ink duct setting in units | 1.75 | 1.25 |
| Printing speed (feet per minute) | 400 | 400 |
| Water window in % | 20-30 | 24-44 |
| Printed optical density in units | 1.58/1.56 | 1.57/1.56/1.48 |
| UV-cure results | 1 lamp high - Good | 1 lamp high - Good |
| Misting properties | Good | Good |

Fountain solution: Rycoline ACFS 193; 5 ounces to each gallon of tap water.
Substrate: C1S (coated one side) paper.

Table 2 shows with a reduced ink duct setting (less ink needed), Example 4 exhibits a higher water window and equivalent optical density than Example 3.

TABLE 3

Press Performance at 1000 ft./min. The inks were tested on a Didde web offset press equipped with two UV-dryers.

| Printing Press results high speed | Example 3 | Example 4 |
|---|---|---|
| Ink duct setting in units | 1.75 | 1.25 |
| Printing speed (feet per minute) | 1000 | 1000 |
| Water window in % | 20% | 24% |
| Printed optical density in units | 1.56 | 1.52 |
| UV-cure results | 1 lamp high - Good | 1 lamp high - Good |
| | 1 lamp low - fair cure | 1 lamp low - Good cure |
| Misting properties | Good | Good |

Table 3 shows that Example 4 exhibits a slightly wider water window, reduced duct setting and comparable optical density when compared to Example 3.

Furthermore Example 4 exhibited a better UV-cure, than Example 3 which showed slightly limited cure properties if the press was run at high speed. Both Example 3 and Example 4 exhibited good lithographic performance on the Didde press trial.

The following exemplifies that steps (a) and (b) of the process can be combined into a single step;

Example 5: Combination of Steps (a) and (b) into a Single Step

Reclaimed or scrap PET (58.6 parts), diethylene glycol (24.9 parts), phthalic anhydride (15.8 parts) were charged to a dry reactor. The mixture was agitated and heated to between 210 and 220° C. under nitrogen and held at this temperature for about 1.5 hours whereby all PET dissolved. Tyzor TBT catalyst (0.2 parts, available from Dorf Ketal, Tyzor TBT is a trademark of Dorf Ketal) was added rapidly and the temperature was increased to 220-230° C. for 6 hours. The binder resin had an acid value of 0.02 mg KOH per gram and a molecular weight of $M_n$=1200 and $M_w$ 2200.

Example 6: Combination of Steps (a) and (b) into a Single Step Followed by Acrylation Step Reclaimed or scrap PET (54.7 parts), 1,2-propanediol (16.7 parts), phthalic anhydride (25.1 parts) were charged to a dry reactor. The mixture was agitated and heated to between 210 and 220° C. under nitrogen and held at this temperature for about 1.5 hours whereby all PET dissolved. Tyzor TBT catalyst (1.0 parts, available from Dorf Ketal, Tyzor TBT is a trademark of Dorf Ketal) was added rapidly and the temperature was increased to 220-230° C. for 7 hours, during which time a small amount of water was removed via a Dean-Stark trap.

Next, an air flow replaced the nitrogen stream for 1 hour and the temperature was lowered to 120 C. An amount of ethoxylated trimethylolpropane triacrylate (EO-TMPTA) (Sartomer) to make a 40-60 wt % solids solutions was added and homogenized for 2 hours. Acrylic acid, 2.5 parts, was added dropwise with 0.1 part of methane sulfonic acid. After 2 hrs., a light brown solution was obtained with Mn=3400 and Mw=4670.

Examples 7 & 8

Two ink formulations Examples 7 & 8 are shown in Table 4. The two lithographic energy curable packaging inks were made on a three roll mill, 3 passes at 1 MPa (25° C.), having the following composition and properties:

TABLE 4

An energy curable lithographic ink (Inventive Example 8) was made comprising the polyester acrylate resin derived from Example 6 and was compared to Example 7.

| Material | Example 7 (Comparative) | Example 8 (Inventive) |
| --- | --- | --- |
| Varnish with inert formaldehyde resin in EO-TMPTA (48%) | 45.00 | — |
| Varnish with polyester acrylate resin of Example 6 in EO-TMPTA (36%) | — | 43.00 |
| Multifunctional acrylate monomer blend (Sun) | 15.50 | 17.50 |
| Flow agent (Tego) | 0.50 | 0.50 |
| Stabilizer (Rahn group) | 1.00 | 1.00 |
| Photoinitiator blend, based on aminobenzoates & benzophenones & aminoketones (Sun) | 13.00 | 13.00 |
| Blue pigment 15:3 (Sun) | 22.00 | 22.00 |
| Inorganic filler (Emerys) | 3.00 | 3.00 |
| Total | 100.00 | 100.00 |
| Set-off test @ OD ~1.5 | | |
| 33 mJ/cm$^2$ | 0.19 | 0.05 |
| 66 mJ/cm$^2$ | 0.09 | 0.01 |
| 100 mJ/cm$^2$ | 0.05 | 0.00 |
| 133 mJ/cm$^2$ | 0.01 | 0.00 |
| Color strength (%) | 100.0 | 102.7 |

Prints (50 μm) were prepared using a prüfbau Deltack on a PE-board to measure the color density and set-off. The coatings were cured with UV-light irradiation (Fusion H-bulb ~200 W/cm) using H-bulb.

Table 4 shows that the UV-cure measured by set-off test was considerably better for Inventive Example 8 vs. Comparative Example 7 (a lower figure set-off figure indicates reduced ink transfer, indicating improved cure).

Inventive Example 8 also exhibited slightly improved color strength as measured using a Gretag-Macbeth CE 2180 color computer.

Examples 9 & 10

Two lithographic UV-curable ink formulations Examples 9 and 10 are shown in Table 5. A cyan UV-curable ink (Example 10) was made on a three roll mill, 3 passes at 1 MPa (25° C.), having the following composition and properties and compared to a standard energy curable offset ink (Example 9—Suncure Starluxe, Sun Chemical Corp.).

TABLE 5

Ink formulations and performance

| Material | Example 9 Suncure Starluxe process cyan (comparative) | Example 10 cyan ink (inventive) [weight %] |
| --- | --- | --- |
| Inert polyester of Example 1 | | 22 |
| Trifunctional acrylate monomer, type Sartomer SR351 (viscosity: 90 mPas) | | 38 |
| Photoinitiator blend containing 40% N,N-dimethylaminobenzoate ethylester, 40% 4-phenylbenzophenone and 20% Irgacure 369 (Trademark of BASF) | | 12 |
| Additives/Fillers | | |
| 43% Magnesium silicate 43% Acrylated epoxidized vegetable oil 7.0% Leveling agent (type Dynoadd F1, Trademark of Dynea company) 7.0% in-can stabilizer (type Florstab UV-1, Trademark of Kromachem company) | | 7 |

TABLE 5-continued

Ink formulations and performance

| Material | Example 9 Suncure Starluxe process cyan (comparative) | Example 10 cyan ink (inventive) [weight %] |
|---|---|---|
| Phthalocyanine pigment, type Fastogen blue (trademark of DIC corporation) | | 21 |
| Total | | 100 |
| Tack @ 150 rpm @ 30° C. [tack-o-scope units] | 213 | 261 |
| Viscosity [Pa*s] @ D = 50 s$^{-1}$ @ 25° C. | 21.3 | 29.8 |
| UV-curing amount of set-off [measured in units of optical density] | | |
| at a UV-dose of 33 mJ/cm2 | 0.27 | 0.14 |
| at a UV-dose of 66 mJ/cm2 | 0.20 | 0.04 |
| at a UV-dose of 100 mJ/cm2 | 0.10 | 0.02 |
| Solvent resistance [IPA double rubs] | 12 | 36 |
| Deinking (optical density of recycled cellulose, comparative ink is set to 100%) see Example 13 | 100% | 79.7% |
| Transfer of ink (measured by weight on OPS) see Example 12 | 34 g | 78 g |

The viscosity and tack of Example 10 are comparable to the Example 9 commercial UV offset ink Suncure Starluxe process cyan.

Furthermore Example 10 exhibits a better cure than Example 9, which is assessed by the set off test and the solvent resistance (lower set-off values and higher solvent rubs observed)

Example 10 also shows better deinking properties (lower color density of recycled deinked paper) than the Example 9. This test is described in detail in Example 13.

Example 10 unexpectedly exhibits a high level of resin speck removal and brightness required to create recyclable paper and this is a further advantage in addition to the fact that such an ink can be made from a substantial amounts of material that otherwise may be disposed as waste.

Furthermore Example 10 ink shows better ink transfer measured by the weight of ink transferred from the printing plate to the blanket under defined conditions than the Example 9 comparative ink. This test is described in detail in Example 12.

Example 10 also shows better solvent resistance than Example 9.

Example 11

To further demonstrate the press performance of inks of the present invention, inks of Example 9 and Example 10 were printed with a "Didde" web offset UV-press (Graphic system services, U.S.A.) equipped with two UV-dryers having medium pressure mercury bulbs. Both inks of Example 9 and Example 10 exhibited good lithographic performance on the Didde press trial.

Example 12: Lithographic Performance & Ink Transfer 1 kg of experimental ink (Example 10) was placed into the ink duct of an "Ink evaluation unit" KGB-0024 from Mitsubishi Heavy Industries Ltd. Fountain solution: de-ionized water, Sunfount 480 (3%) from Sun Chemical Company, isopropyl alcohol (5%) and rehardener (0.5%). The roller speed was set to 300 meters per minute, roller temperature was 30° C. The ink was run for approximately 20 minutes (starting dampening settings 35%, ink settings constant @ 8%) in order to achieve a constant film weight of approximately 2.5 µm, measured at ink weight sensor near the printing plate.

Then, the fountain solution setting was decreased by 5% and 10% every 2 minutes. Then, the fountain solution was further increased by 10% and further increased by 3%, 6%, 9%, and 12% every 2 minutes and back to starting dampening settings and the change of film weight and water was detected. The amount of transferred ink was measured in grams.

During the experiment, the ink weight and water conditions were monitored. The target was to obtain a stable ink film weight near the printing plate throughout the whole experiment, which illustrates a robust lithographic performance, which was the case for Example 10. The same experiment with the same settings was conducted with the ink of Example 9, with similar results as Example 10, showing that the inks of the present invention have good lithographic performance and are equivalent to a commercial UV lithographic ink Example 13: Deinking Preparation of Printed Sheets of Paper which are Later Used for the De-Inking Evaluation:
50 to 55 g paper (STD-LWC 70 g/m$^2$) was full-surface printed with an ink prepared as described in Example 9 (comparative) and Example 10 (inventive) on a single side of the paper using a Peach Proofer (Rycobel group). The instrument consists of two parts: the inker and the printer unit. The inker is a three roller system, made of a driving roller, an oscillating roller and a rubber distribution roller which transfers ink to the print disc. The print disc is then transferred to the printer unit. The material to be printed is clipped on to the substrate carrier and placed on the printing ledge of the printer. The print disc is then lowered into position and a print produced. The parameters were adjusted to produce prints with a cyan density of 1.2 to 1.6 measured with a SpectroEye of Gretag AG densitometer. The prints were torn into pieces using a paper shredder producing stripes of (0.4×20) cm. The preparation and dosing of chemicals was done as given in INGEDE Method 11:
Preparation of Deinking Solution A:
6 g of sodium hydroxide was dissolved in 1.3 l of de-ionized water and heated slightly to approximately 60° C. 8 g of oleic acid was then added. The mixture was stirred until the solution became clear, then 18 g of sodium silicate was added. Finally de-ionized water was added until the solution volume reached 2 l.
Preparation of Deinking Solution B:
100 ml of hydrogen peroxide solution was used for each test. This was prepared by adding 4 g of hydrogen peroxide solution (35% in water) to de-ionized water.

During sample preparation, a constant temperature of 45° C. was maintained. The dilution water is therefore stored in a water bath whose temperature is controlled accordingly.

TABLE 6

The de-inking mixture was prepared according to the following recipe:

| | |
|---|---|
| Printed paper, printed as described above: | 50 g |
| Deionized water: | 208 g |

TABLE 6-continued

The de-inking mixture was prepared
according to the following recipe:

| Deinking solution A: | 100 g |
|---|---|
| Deinking solution B: | 25 g |
| Deionized water: | 117 g |

The mixture was stirred in a Dissolver for 20 minutes resulting in a homogenous pulp. About 350 g water, which was pre-heated to 45° C. before addition, is added to make stirring of the mass easier. After 20 minutes, the pulp is filled up with 45° C. hot water so that the sum of mass of all ingredients is 1,050 g. The pulp is stored for 60 minutes in a water bath at 45° C.

Next, the pulp was poured into the pre-treated flotation cell as described in 5.13 in the INGEDE Method 11. Parameters (e.g. air supply rate and stirrer speed were used as given in 5.13.1 of the Method). During the entire flotation process, the froth was removed.

After a flotation period of 10 minutes the air supply and the stirrer were switched off.

A specimen is obtained by filtration of the pulp. Values obtained by measurement of the color strength of the specimen where Ink of Example 9 (comparative) was used was compared with the color strength of the specimen where Ink of Example 10 (inventive) was used.

Example 14: Performance of Lithographic Inks Containing Inert Polyester Resin Derived from Recycled PET on Press The two cyan UV-curable inks of Example 9 and 10 were tested on a Didde narrow web offset press equipped with two UV-dryers @ 240 Watts/cm. Fountain solution: Rycoline ACFS 193; 5 ounces to each gallon of tap water. Substrate: C1S (coated one side) paper

TABLE 7

Lithographic performance

| Printing press results: | Ink of Example 9 (comparison) | Ink of Example 10 (inventive) |
|---|---|---|
| Printing speed (feet per minute) | 400 | 400 |
| Printed optical density in units | 1.60 | 1.58 |
| UV-lamp energy/UV-cure results | 1 lamp high - Good | 1 lamp high - Good |
| Misting properties | Good | Good |

The ink with inert polyester resin derived from recycled PET was comparable to the standard. Both inks showed a good performance on the press.

Example 15: Energy-Curable Flexographic Consumer Product Packaging Inks

The inert polyester resin produced in Example 1 was incorporated into an energy-curable flexographic consumer product packaging inks as follows;

Ebecryl LEO 10501 from Allnex company was heated with Genopol 16 stabilizer to a temperature of 90° C. and the inert polyester resin produced in Example 1 was periodically added as the mixture was stirred until all resin material was fully dissolved, resulting in a clear and homogenous solution. The mixture was then filtered through a clean 100 μm brass filter. The formulation is shown in Table 8.

TABLE 8

| Material | Weight % |
|---|---|
| inert polyester resin derived from recycled PET | 45.0 |
| Ebecryl LEO 10501 (Allnex) | 54.0 |
| Genorad 16 (Rahn group) | 1.0 |
| Total | 100 |
| Viscosity | 40.1 Pas @ 25° C. (Shear rate D = 1/50 seconds) |
| Color | 5-6 Gardner |

To make an UV-curable reflex blue flexographic ink, the resin solution was added to other ink components and the mixture was rendered into a flexographic ink by the typical procedures known in the art, such as pre-dispersing in a dissolver, three-roll milling or bead-milling or combination milling, until the desired degree of grinding was achieved. The formulation is shown in Table 9. The ink was applied in different coating weights with an Erichsen printing proofer, Model 628 on Aluminum substrate, suitable for yoghurt cup lids.

TABLE 9

| Raw Material | Weight (g) |
|---|---|
| rPET-Polyester solution | 17.50 |
| Genorad 16 (Rahn group) | 2.00 |
| EFKA 7701 (BASF) | 7.50 |
| Raylack 19 (Sunchemical) | 25.00 |
| SR 494 LM (Allnex) | 32.0 |
| Ebecryl Leo 10502 | 5.00 |
| Airex 920 (Evonik) | 0.10 |
| Twin 4000 (Evonik) | 0.20 |
| Esacure 1001 (Lamberti) | 2.00 |
| Photoinitiator solution (40%) | 18.50 |
| Tego Wet 500 (Evonik) | 1.00 |
| Helogenblue D7110 (BASF) | 23.50 |
| Hostapermviolett PL-R (Clariant) | 17.50 |
| Total | 151.80 |
| Viscosity @ D = 2 $s^{-1}$ [Pas] | 6.10 |
| Viscosity @ 100 $s^{-1}$ [Pas] | 1.42 |
| Viscosity @ 2 $s^{-1}$ [Pas] repeat | 2.21 |
| Appearance of print on aluminum (glossy) | ok |
| Ink Transfer | high |
| Solvent resistance versus ethyl acetate | 15 double-rubs |

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A process for preparing a polyester acrylate resin having a number average molecular weight of at least 800 Da comprising:
    (a) reacting polyethylene terephthalate (PET) with one or more polyhydric alcohols to provide a depolymerization product;
    (b) reacting the depolymerization product with a polybasic carboxylic acid and/or anhydride and optionally a polyhydric alcohol to form a polyester polyol; and (c) reacting the polyester polyol with acrylic acid in the presence of an acid catalyst, whereby a polyester acrylate resin is produced.

2. The process according to claim 1, wherein the PET is selected from waste PET material generated in PET production processes, waste PET material generated in the production of PET molded articles, and waste PET molded articles.

3. The process according to claim 1, wherein the polyhydric alcohol is selected from neopentyl glycol, trimethylolpropane, and mixtures thereof.

4. The process according to claim 1, wherein the wt % ratio of PET to polyhydric alcohol in step (a) is between 20:1 to 1:10.

5. The process according to claim 1, further comprising adding a catalyst in step (a) to promote the depolymerization reaction.

6. The process according to claim 5, wherein the catalyst is selected from tetraisopropyltitanate, and titanium (IV) butoxide.

7. The process according to claim 5, wherein the amount of the catalyst is between 0.01 to 2.50 wt % based on the total weight of reaction mixture.

8. The process according to claim 1, wherein the reaction of step (a) is carried out at a temperature of between 160 to 260° C.

9. The process according to claim 1, wherein the anhydride is selected from phthalic acid anhydride and methylhexahydrophthalic acid anhydride.

10. The process according to claim 1, wherein polyhydric alcohol is reacted with the depolymerization product in step (b).

11. The process according to claim 10, wherein the polyhydric alcohol reacted with the depolymerization product in step (b) is added in an amount of 20 wt % or less based on the weight of the depolymerization product.

12. The process according to claim 1, wherein step (b) is carried out at a temperature of between 180° C. to 220° C.

13. The process according to claim 1, wherein step (b) is carried out until the acid value of the reaction mixture is reduced to between 2 to 50 mg KOH/g.

14. The process according to claim 1, wherein the polyester polyol has a number average molecular weight ($M_n$) of between 850 and 5,000 Da and/or has a weight average molecular weight ($M_w$) of between 1500 and 25,000 Da.

15. The process according to claim 1, wherein step (c) is additionally carried out in the presence of a polymerization inhibitor.

16. The process according to claim 15, wherein the inhibitor is selected from a phenol, a copper-based inhibitor, and an aluminium-based inhibitor.

17. The process according to claim 1, wherein the acid catalyst is methanesulfonic acid.

18. The process according to claim 1, wherein step (c) is carried out at a temperature of between 80 to 130° C.

19. The process according to claim 1, wherein steps (a) and (b) are carried out simultaneously.

20. The process according to claim 1, wherein the polybasic carboxylic acid and/or anhydride are added in an amount of less than 60 wt %, based upon the weight of the depolymerization product.

21. A process for preparing a polyester acrylate resin having a number average molecular weight of at least 800 Da comprising:
(a) reacting polyethylene terephthalate (PET) with one or more polyhydric alcohols to provide a depolymerization product;
(b) reacting the depolymerization product with a polybasic carboxylic acid and/or anhydride, a monofunctional acid, and optionally a polyhydric alcohol to form a polyester polyol; and
(c) reacting the polyester polyol with acrylic acid in the presence of an acid catalyst, whereby a polyester acrylate resin is produced.

22. An energy curable coating composition or ink comprising the polyester acrylate resin prepared by the method according to claim 1.

23. The coating composition or ink according to claim 22, comprising between 15 to 50 wt % of the polyester acrylate resin.

24. The coating composition or ink according to claim 22, comprising a further acrylated oligomer, an acrylic monomer, an organic or inorganic pigment and/or a photoinitiator.

25. The coating composition or ink according to claim 24, comprising between 25 to 45 wt % of one or more acrylic monomers.

26. The coating composition or ink according to claim 25, wherein the one or more acrylic monomers is selected from trimethylolpropane triacrylate, alkoxylated trimethylolpropane triacrylate, propoxylated pentaerythritol tetraacrylate, and mixtures thereof.

27. An article with a cured coating or ink thereon comprising a cured coating composition or ink according to claim 22 on a surface of the article.

28. A process for preparing an article with a coating or an ink printed thereon comprising:
a) applying the coating composition or ink according to claim 22 to a surface of an article and
b) curing the coating composition or ink.

29. The process according to claim 28, wherein the article is food packaging article.

30. An energy curable coating composition or ink comprising between 2 to 40 wt % of an inert polyester resin prepared by a method comprising the steps of:
(a) reacting polyethylene terephthalate (PET) with one or more polyhydric alcohols to provide a depolymerization product; and
(b) reacting the depolymerization product with a polybasic carboxylic acid and/or anhydride and optionally a polyhydric alcohol to form a polyester polyol;
(c) reacting the polyester polyol with acrylic acid in the presence of an acid catalyst, whereby a polyester acrylate resin is produced;
wherein the inert polyester resin comprises a polyethylene terephthalate oligomer having about 40 to 70 wt % recurring ethylene terephthalate units, recurring units of C3+ alpha alkylene terephthalate, hydroxy alkylene terephthalate and pendant units of polybasic aliphatic, alicyclic or aromatic monocarboxylate.

* * * * *